United States Patent [19]
Giorgini

[11] Patent Number: 5,319,912
[45] Date of Patent: Jun. 14, 1994

[54] SAFETY RAKE

[76] Inventor: Emanuel L. Giorgini, 1351 Poplar, Kulpmont, Pa. 17834

[21] Appl. No.: 73,568

[22] Filed: Jun. 9, 1993

[51] Int. Cl.⁵ .............................................. A01D 7/04
[52] U.S. Cl. ................................. 56/400.19; 172/378
[58] Field of Search ......... D8/13; 56/400.01, 400.17, 56/400.19, 400.18, 400.20; 294/51, 52, 53.5; 172/378

[56] References Cited

U.S. PATENT DOCUMENTS

| 767,420 | 8/1904 | McLoughlin | 56/400.2 |
| 1,223,722 | 4/1917 | Offermann | 294/52 |
| 1,452,984 | 4/1923 | Richards | 56/400.18 |
| 1,612,894 | 1/1927 | Thompson | 56/400.2 |
| 2,286,939 | 6/1942 | Swanson | 56/400.2 |
| 2,855,746 | 10/1958 | Miller | 56/400.19 |

Primary Examiner—Ramon S. Britts
Assistant Examiner—James A. Lisehora
Attorney, Agent, or Firm—Jacobson, Price, Holman & Stern

[57] ABSTRACT

A rake is provided including a U-shaped bail supported from the handle and a tine construction incorporating an elongated bar and a plurality of laterally outwardly projecting tines extends between and supported from the free ends of the arms of the bail for movement between an extended operative position with the plane of the tines disposed substantially normal to the plane of the bail and a retracted position with the plane of the tines substantially corresponding with the plane of the bail and the tines fully enclosed within the confines of the bail and projecting toward the free end of the handle which projects outwardly from the longitudinal center portion of the bight portion of the bail. Detent structure is provided for releaseably retaining the tine construction in its extended or operative position as well as in its retracted position and the tine construction and bail include coacting stop structure for limiting pivoting of the tine construction from the retracted position to the operative position.

6 Claims, 1 Drawing Sheet

SAFETY RAKE

BACKGROUND OF THE INVENTION

1. FIELD OF THE INVENTION

This invention relates to a rake of the stiff or hard tine type wherein the tines usually are fixed in a plane substantially normal to the plane of the bail of the rake. However, in the instant invention the tine construction, including a transverse bar outwardly from one side of which the tines project, is pivotally mounted from the bail of the rake in a manner such that the tine construction may be swung from the usual operative position thereof with the tines disposed in a plane normal to the plane of the rake bail to a stored position in which the plane containing the bail construction substantially coincides with the plane of the rake bail and with the free ends of the tines fully enclosed within the confines of the bail and projecting toward the free end of the handle of the rake.

2. DESCRIPTION OF RELATED ART

Various different forms of self cleaning rakes heretofore have been provided including some of the general and operational features of the instant invention heretofore have been provided such as those disclosed in U.S. Pat. Nos. 2,126,719, 2,162,648, 2,211,236, 2,702,981 and 3,378,996. However, these previously known forms of rakes do not include all of the structural and operational features of the instant invention.

SUMMARY OF THE INVENTION

The safety rake of the instant invention utilizes a stiff or rigid tine construction pivotally mounted from the bail of the rake in a manner such that the tine construction may be pivoted from an operative position with the tines disposed in a plane substantially normal to the plane of the bail of the rake or to a stored position with the plane of the tines substantially coinciding with the plane of the rake bail and with the free ends of the tines closely opposing the bight portion of the rake bail.

Detent structure is provided for releasably retaining the tine construction in each of its two positions and the tine construction and the bail further include coacting abutment structure whereby movement of the tine construction from the retracted or stored position to the extended operative position with the plane of the tines disposed substantially normal to the plane of the rake bail is positively limited.

The main object of this invention is to provide a stiff or rigid tine rake incorporating a safety feature which will prevent substantially all of the accidents associated with the use of stiff or rigid tine rakes.

Another object of this invention is to provide a stiff or rigid tine rake construction incorporating a pivoted tine construction whereby the tines may be pivoted to a collapsed or storage position with the plane containing the rake tines substantially coinciding with the plane of the rake bail and with the free ends of the tines projecting toward the free end of the handle of the rake. In this manner, the rake may be compactly stored either leaning up against a wall or hanging from a wall.

Another very important object of this invention is to provide a safety rake in accordance with the preceding objects and wherein the tine construction, when in the collapsed or stored position, is yieldingly retained therein through the utilization of detent structure.

A final object of this invention to be specifically enumerated herein is to provide a stiff or rigid tine construction rake in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
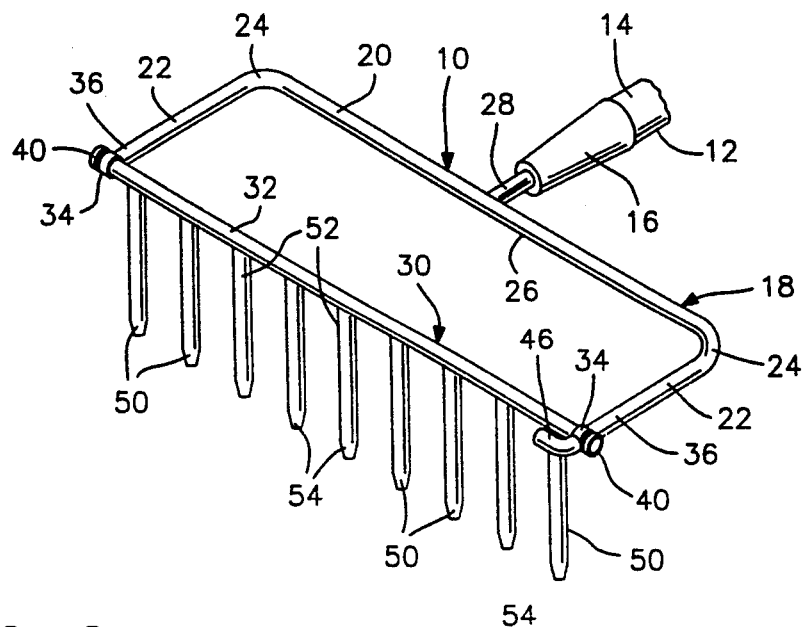
FIG. 1 is a perspective view of a rake constructed in accordance with the present invention with all but the head end of the handle of the rake being broken away and with the tine construction of the rake pivoted to the operative position thereof.

Referring now more specifically to the drawings the numeral 10 generally designates the rake of the instant invention. The rake 10 includes an elongated handle 12 (fragmentarily illustrated in FIG. 1) having a head end 14 anchored within a tapered socket member 16.

The rake 10 includes a head referred to in general by the reference numeral 18 incorporating a substantially U-shaped bail 20 consisting of a pair of laterally spaced apart and generally parallel arms 22 interconnected at their base ends 24 through the utilization of a bight portion 26 extending and secured therebetween. The longitudinal center of the bight portion 26 includes a threaded shank 28 which projects outwardly therefrom in a direction opposite to the direction in which the arms 22 project and which has its free end threadingly engaged within that portion of the head end 14 disposed within the socket member 16.

The rake 10 further includes a tine construction referred to in general by the reference numeral 30 and consisting of an elongated rod or bar 32 extending between and having its opposite ends journaled through transverse journal portions 34 carried by the free ends 36 of the arms 22. Each of the journal portions 34 supports a captive spring biased detent ball 38 therefrom and the opposite ends of the rod or bar 32 include diametrically enlarged heads 40 including detent recesses 42 and 44 relatively angularly displaced about the corresponding head 40 approximately 90°. In addition, at least one of the journal portions 34 includes a horizontal stop member 46 supported therefrom and the rod or bar 32 includes longitudinally spaced at least semirigid tines 50 having base ends 52 secured to the rod or bar 32 and free ends 54 which project outwardly from the rod or bar 32.

The bail 20 is constructed of stiff and slightly resilient material such that the free ends 36 of the arms 32 are yieldingly biased outwardly towards the heads 40.

Figure 2:
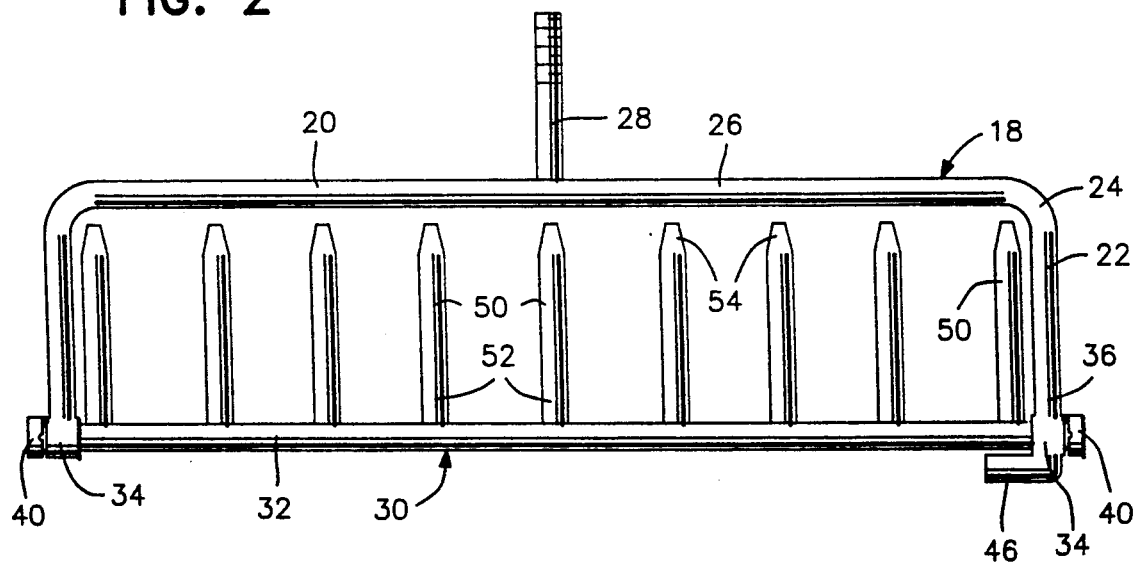
FIG. 2 is a plan view of the rake head including the U-shaped bail thereof and with the tine construction pivoted to the retracted or storage position thereof.
Figure 3:
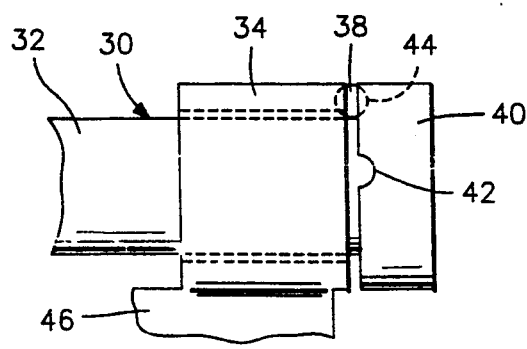
FIG. 3 is an enlarged fragmentary elevational view of the extreme lower right hand portion of the construction illustrated in FIG. 2.

When the tine construction 30 is pivoted to the position thereof illustrated in FIG. 1 of the drawings, the tine construction 30 is disposed in a plane substantially normal to the plane of the bail 20 and the tine 50 disposed at the right end of FIG. 1 abuts against the stop member 46 in order to limit pivotal movement of the tine construction 30 to the extended or operative position. In addition, when in the operative position, the detent ball 38 is seated in the detent recess 42. However, when it is desired to render the rake 10 in a safe mode or in a mode for storage, the tine construction 30 is angularly displaced in a counterclockwise direction as viewed in FIG. 1 of the drawings until the tine construction 30 is in the position thereof illustrated in FIG. 2. In this position the tines 50 are enclosed fully within the bail 20, the free ends of the tines 50 project in the direction in which the handle 12 extends from the shank 28 and the free ends 54 of the tines 50 are disposed closely adjacent the bight portion 26. Thus, the tine construction 30 is disposed in a plane which substantially coincides with the plane of the bail 20 and the ball detent 38 is seated in the detent recess 42, whereby the tine construction 30 is releasably retained in the retracted position.

The foregoing is considered as illustrative only of the principles of the invention. Further, since numerous modifications and changes readily will occur to those skilled in the art, it is not desired t limit the invention to the exact construction and operation shown and described, and, accordingly all suitable modification and equivalents may be resorted to, falling within the scope of the invention.

What is claimed as new is as follows:

1. A safety rake including a substantially U-shaped bail disposed generally in a first plane and incorporating (1) a pair of laterally spaced, generally parallel arms having base and free ends and (2) a bight portion extending between and rigidly connecting said base ends, said rake further including an elongated handle having one end thereof attached to said bight portion and projecting outwardly therefrom in a direction generally opposite to the direction in which said free ends project, a tine construction including an elongated bar extending lengthwise between said free ends and mounted therefrom for angular displacement of said bar relative to said bail about an axis generally paralleling said first plane, said bar including a plurality of elongated, laterally spaced apart tines having base and free ends and supported from said bar at their base ends at points spaced along said bar and with the free ends of said tines projecting outwardly of said bar in substantially the same direction, said bail and bar including coacting abutment means limiting angular displacement of said bar relative to said bail in one direction to a first extended, operative position with said tines disposed generally in a second plane generally normal to said first plane, said tine construction and bail including coacting detent means releasably latching said tine construction in said first position and also operative to releaseably latch said tine construction in a second position with said second plane at least generally paralleling said first plane and disposed at least closely adjacent said first plane with said free ends projecting toward said bail, in which second position said free ends of said tines are confined within the confines of said U-shaped bail.

2. The rake of claim 1 wherein said free ends of said arms include journal portions through which the opposite ends of said bar are rotatably received and extend, said journal portions including adjacent and remote sides, the terminal ends of said bar including diametrically enlarged heads having adjacent sides opposing said remote sides of said journal portions, said detent means including detent projections supported from said remote sides of said journal portions and detent recesses formed in sand spaced about said adjacent sides of said heads in which said detent projections are selectively engageable.

3. The rake of claim 1 wherein the length of said tines is only slightly less than the length of said arms between said bar and said journal portions.

4. The rake of claim 2 wherein said coacting abutment means comprises one of said tines disposed at one end of said bar and a stop member carried by the adjacent journal portion and projecting toward the opposite journal portion and with which said one tine is abuttingly engageable.

5. The rake of claim 4 wherein said free ends of said arms include journal portions through which the opposite ends of said bar are rotatably received and extend, said journal portions including adjacent and remote sides, the terminal ends of said bar including diametrically enlarged heads having adjacent sides opposing the remote sides of said journal portions, said detent means including detent projections supported from the remote sides of said journal portions and detent recesses formed in and spaced about said adjacent sides of said heads in which said detent projections are selectively engageable.

6. The rake of claim 5 wherein the length of said tines is only slightly less than the length of said arms between said bar and said journal portions.

* * * * *